United States Patent
Livesay et al.

(10) Patent No.: US 6,971,334 B1
(45) Date of Patent: Dec. 6, 2005

(54) STRETCHABLE DOG LEASH

(76) Inventors: William C. Livesay, 1591 Charnelton, Eugene, OR (US) 97401; Arthur Villums, 1591 Charnelton, Eugene, OR (US) 97401

( * ) Notice: Subject to any disclaimer, the term of this patent is extended or adjusted under 35 U.S.C. 154(b) by 0 days.

(21) Appl. No.: 10/788,737

(22) Filed: Feb. 26, 2004

Related U.S. Application Data

(60) Provisional application No. 60/451,111, filed on Feb. 27, 2003, provisional application No. 60/496,875, filed on Aug. 20, 2003.

(51) Int. Cl.[7] .............................................. A01K 27/00
(52) U.S. Cl. ...................... 119/798; 119/797; 119/792
(58) Field of Search ..................... 119/795, 797, 792, 119/793, 770, 771, 769, 798

(56) References Cited

U.S. PATENT DOCUMENTS

| | | | |
|---|---|---|---|
| 2,737,154 A | | 3/1956 | Michonski |
| 2,861,547 A | * | 11/1958 | Dale .......................... 119/797 |
| 3,752,127 A | * | 8/1973 | Baker ......................... 119/797 |
| 4,765,279 A | * | 8/1988 | Klickstein ................... 119/770 |
| 5,146,876 A | * | 9/1992 | McPhail ...................... 119/798 |
| 5,154,660 A | * | 10/1992 | Snyder et al. ............... 119/771 |
| 5,706,764 A | | 1/1998 | Irbinskas |
| 5,718,189 A | * | 2/1998 | Blake .......................... 119/770 |
| 5,806,467 A | * | 9/1998 | Arakawa ..................... 119/771 |
| 5,873,328 A | | 2/1999 | Campbell |
| 6,085,500 A | * | 7/2000 | Keppick ........................ 54/71 |
| 6,467,437 B2 | * | 10/2002 | Donovan et al. ........... 119/798 |
| 6,539,897 B1 | * | 4/2003 | Dossenback ................ 119/795 |
| 6,626,131 B2 | * | 9/2003 | Moulton, III ............... 119/770 |
| 6,626,132 B1 | * | 9/2003 | Mann .......................... 119/795 |
| 6,834,621 B1 | * | 12/2004 | O'Neill ....................... 119/771 |

FOREIGN PATENT DOCUMENTS

| | | | | |
|---|---|---|---|---|
| JP | 10309146 A | * | 11/1998 | .......... A01K 27/00 |
| JP | 2002191251 A | * | 7/2002 | .......... A01K 27/00 |
| JP | 2003189752 A | * | 7/2003 | .......... A01K 27/00 |

* cited by examiner

*Primary Examiner*—Son T. Nguyen
(74) *Attorney, Agent, or Firm*—Robert E. Howard

(57) ABSTRACT

A dog leash that includes a handle, an elastic strap portion, an inelastic strap portion, and means for attaching either the elastic portion or inelastic portion to a dog collar. The elastic and inelastic portions are connected to each other by either a releasable buckle or a non-releasable buckle. A releasable inelastic locking strap assembly can be attached to the same members to which the elastic strap is attached to provide a leash with both a stretchable mode and a non-stretchable mode.

6 Claims, 5 Drawing Sheets

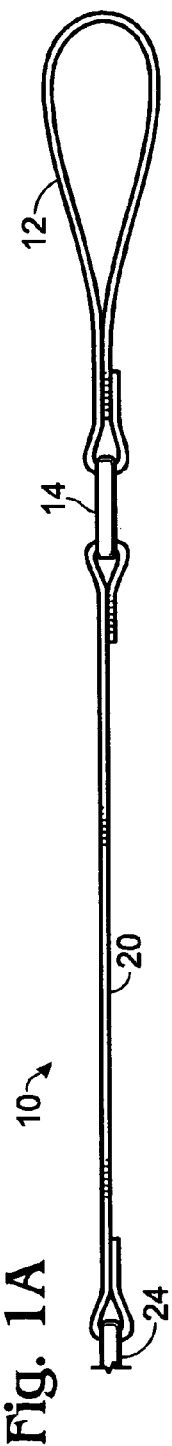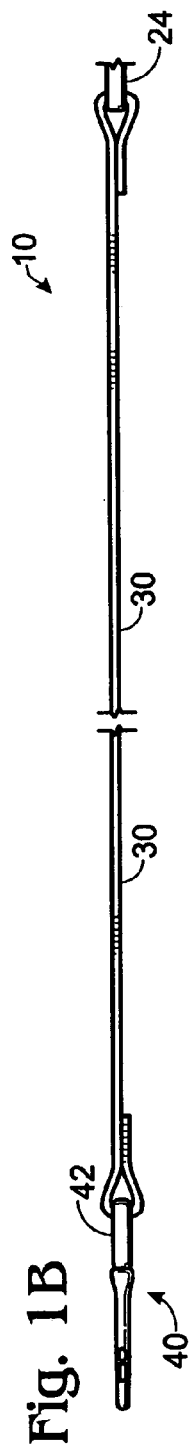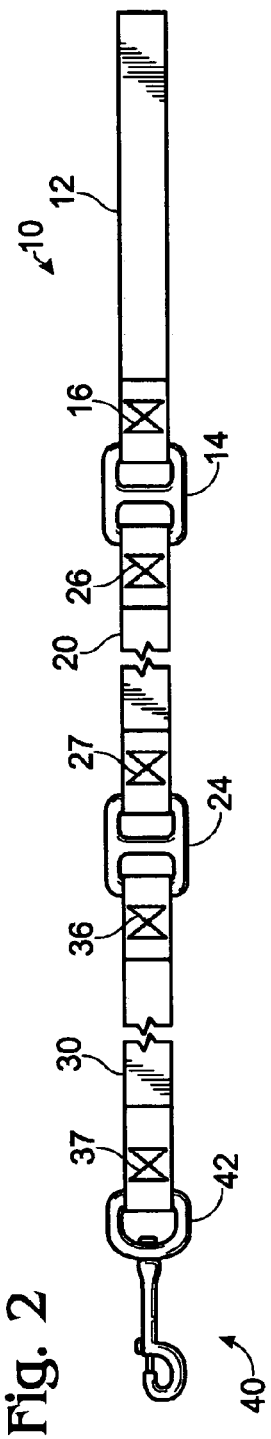

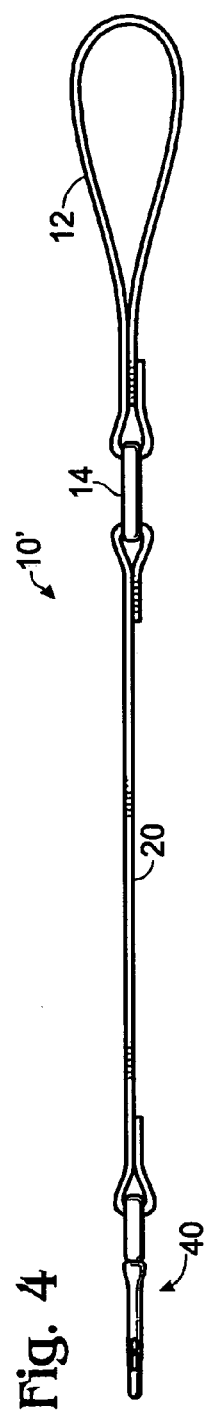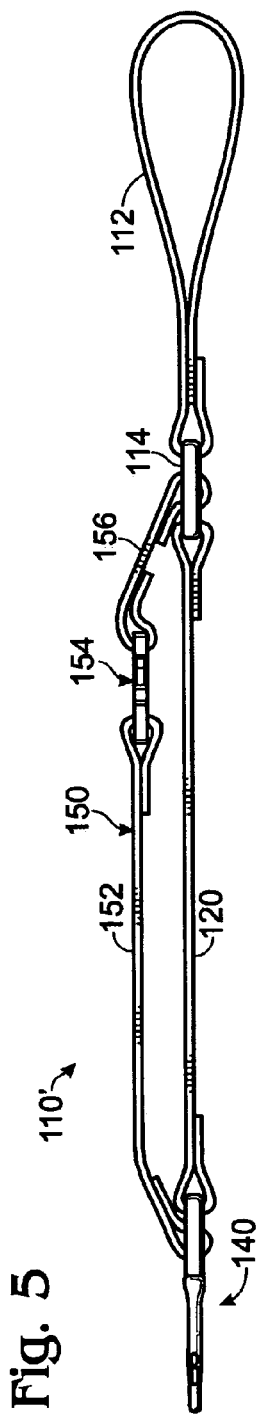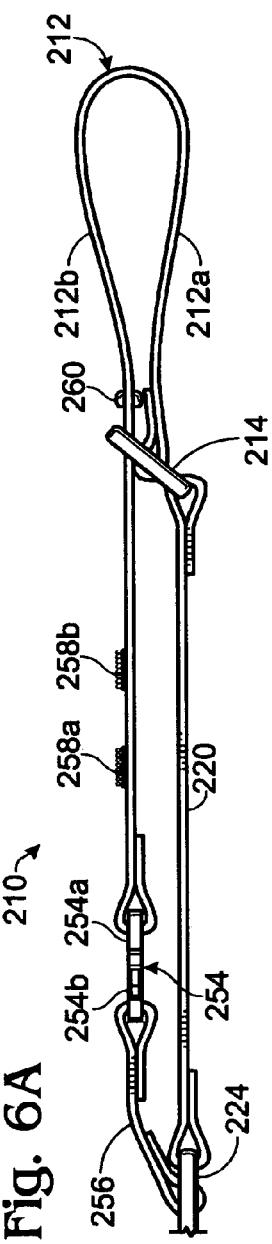

STRETCHABLE DOG LEASH

CROSS-REFERENCE TO RELATED APPLICATIONS

This application claims the benefit of U.S. Provisional Application No. 60/451,111, filed Feb. 27, 2003, and U.S. Provisional Application No. 60/496,875, filed Aug. 20, 2003.

BACKGROUND OF THE INVENTION

The present invention relates to a stretchable dog leash. The invention also relates to a dog leash having a stretchable mode and a non-stretchable mode.

SUMMARY OF THE INVENTION

It is an object of the present invention to provide a dog leash that has a stretchable mode.

The dog leash of the present invention includes a handle, an elastic strap portion, an inelastic strap portion, and means for attaching either the elastic or the inelastic strap portion to the collar of a dog. The elastic and inelastic portions are connected to each other by either a releasable buckle or a non-releasable buckle.

A releasable inelastic locking strap assembly can be attached to the same members to which the elastic strap is attached to provide a leash with both a stretchable mode and a non-stretchable mode.

BRIEF DESCRIPTION OF THE DRAWINGS

FIG. 1A is a side elevation view of the elastic (stretchable) portion of a first embodiment of the dog leash of the present invention;

FIG. 1B is a side elevation view of the non-elastic (non-stretchable) portion of a first embodiment of the dog leash of the present invention;

FIG. 2 is a bottom plan view of the dog leash of the first embodiment of the present invention;

FIG. 4 is a side elevation view of a shortened version of the first embodiment of the dog leash of the present invention;

FIG. 5 is a side elevation view of a shortened version of the second embodiment of the dog leash of the present invention;

FIG. 6A is a side elevation view of the outer portion of a third embodiment of the dog leash of the present invention, with the locking strap portion of the looped handle shown in its locked mode;

DESCRIPTION OF PREFERRED EMBODIMENTS

Figure 3A:
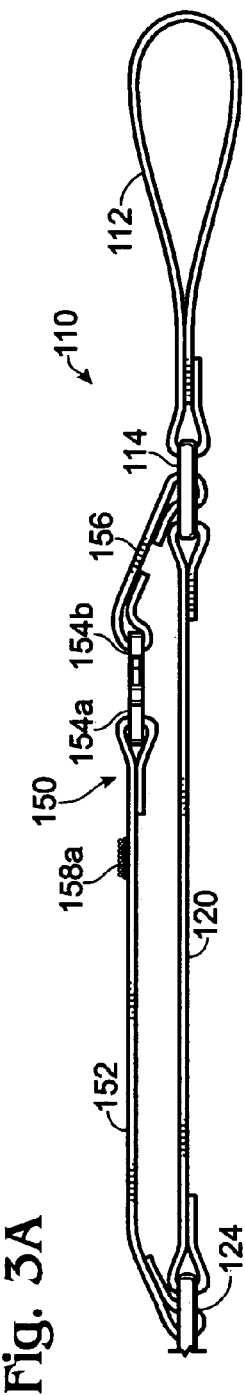
FIG. 3A is a side elevation view of the elastic portion of a second embodiment of the dog leash of the present invention, with the locking strap shown in its locked mode.

A dog leash 10 of a first embodiment of the present invention is shown in FIGS. 1A, 1B and 2. The leash 10 includes a looped strap handle 12 attached at its closed end to a first end of outer buckle 14. An elastic strap portion 20 is attached at its outer end to the second end of outer buckle 14 and at its inner end to the first end of inner buckle 24. An inelastic strap portion 30 is attached at its outer end to inner buckle 24 and at its inner end to swivel snap 40. Swivel snap 40 is adapted to connect to the collar of a dog (not shown) in a manner well known in the art.

Buckles 14 and 24 are generally rectangular in shape, and have three "bars" extending between the sides thereof as best seen in FIG. 2.

Handle 12 is formed of a strap looped through the outer bar of outer buckle 14 and brought back upon itself, as shown, where the overlapping ends thereof are attached by any suitable means, such as sewing with stitching 16.

Handle 12, elastic strap portion 20 and inelastic strap portion 30 all are formed of strapping have substantially the same width. Preferably, the strapping width is about one inch. The length of inelastic strap portion 30 is preferably greater than the length of elastic strap portion 20, and preferably about twice the length of elastic strap portion 20.

Elastic strap portion 20 is attached to outer buckle 14 by looping its outer end through the inner bar of buckle 14 and attaching the overlapping outer end portions together by any suitable means, such as stitching 26. Elastic strap portion 20 can be formed of any commercially available elastic strap material, such as "stretch nylon".

Elastic strap portion 20 is attached to inner buckle 24 by looping its inner end through the outer bar of buckle 24 and attaching the overlapping inner end portions together by any suitable means, such as stitching 27.

Inelastic strap portion 30 is attached to inner buckle 24 by looping its outer end through the inner bar of buckle 24 and attaching the overlapping outer end portions together by any suitable means, such as stitching 36.

The inner end of inelastic strap portion 30 is looped through the buckle or clasp 42 of swivel snap 40 and brought back upon itself, as shown, where the inner end is attached to the adjacent section of inelastic strap portion 30 by any suitable means, such as stitching 37.

Swivel snap 40 can be any commercially available snap device that can be attached at one end to inelastic strap portion 30 and at its other end to a dog collar.

In use, the swivel snap 40 of leash 10 is attached to the collar of a dog. If while walking the dog the dog darts forward, elastic strap portion 20 stretches, thereby preventing a jerk to the arm of the person walking the dog.

However, the dog cannot extend the leash 10 beyond the limit of stretchability of elastic strap portion 20. Thus, leash 10 acts as a "shock absorber" to any unexpected forward motion of the dog.

Figure 3B:
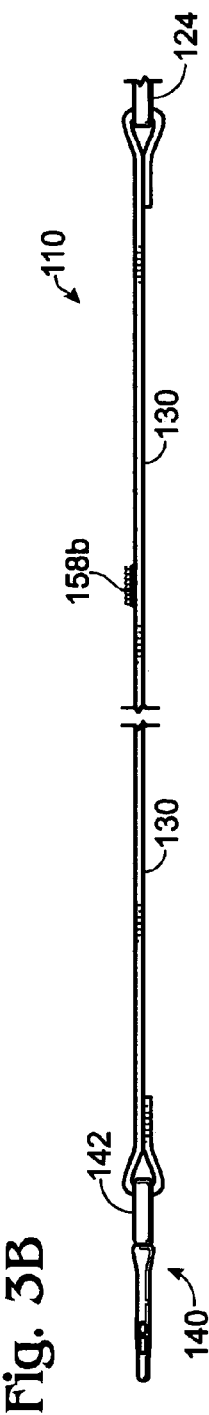
FIG. 3B is a side elevation view of the non-elastic portion of the second embodiment of the dog leash of the present invention.
Figure 3C:
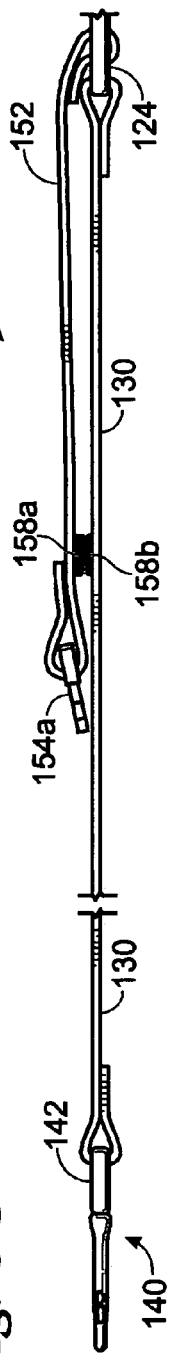
FIG. 3C is a side elevation view of the non-elastic portion of the second embodiment of the dog leash of the present invention, with the locking strap shown in its unlocked mode.

FIGS. 3A, 3B and 3C illustrate a second embodiment in which the leash 110 can be placed into either a stretchable (unlocked) mode or a non-stretchable (locked) mode. In the second embodiment shown in FIGS. 3A, 3B and 3C, elements identical to elements appearing in the first embodiment shown in FIGS. 1A, 1B and 2 have identical reference numbers but increased by 100.

An inelastic locking strap assembly 150 is interposed between outer and inner buckles 114 and 124. Inelastic locking strap assembly 150 includes an elongated inelastic locking strap 152, releasable buckle portions 154a and 154b, and a shortened inelastic locking strap 156.

The inner end of inelastic locking strap 152 is attached to the middle bar of inner buckle 124 by looping and stitching. The outer end of inelastic locking strap 152 is attached to releasable buckle portion 154 by looping and stitching. Releasable buckle portion 154b is attached to the inner end of a shortened inelastic strap member 156 by looping and stitching.

The outer end of inelastic strap member 156 is attached to the middle bar of outer buckle 114 by looping and stitching.

The releasable buckle made up of portions 154a and 154b may be any commercially available releasable buckle having clasps at both ends adapted to receive straps 152 and 156 therethrough for looping and stitching. A satisfactory releasable buckle 154 is of the type made by National Molding under the trademark "MOJAVE".

In FIG. 3A the leash 110 is shown in its non-stretchable mode with inelastic locking strap 152 buckled to shortened inelastic locking strap member 156. In this mode, elastic strap portion 120 is prevented from stretching by inelastic locking strap assembly 150.

Upon release of the two portions 154a and 154b of the buckle, inelastic locking strap 152 is separated from shortened inelastic locking strap 156, and elastic strap portion 120 is then free to stretch in the same manner as elastic strap portion 20 in leash 10 described above with reference to FIGS. 1A, 1B and 2.

To prevent inelastic locking strap 152 from flopping about when disengaged from shortened inelastic locking strap 156, inelastic locking strap 152 can be releasably attached to inelastic strap 130 by means of mating hook and loop fastener portions 158a and 158b, as shown in FIG. 3C. While only one mating hook and loop fastener means 158a, 158b have been shown in FIG. 3C, a plurality of such mating fastener means spaced along inelastic strap 130 and inelastic locking strap 152 could be used. Hook and loop fastening means could also be attached to that side of buckle portion 154a facing inelastic strap 130.

While leashes 10 and 110 have been shown as having elastic strap portions 20 and 120, respectively (as shown in FIGS. 1A and 3A) attached to a non-stretchable strap portions 30 and 130, respectively (as shown in FIGS. 1B, 3B and 3C), the inner ends of the elastic strap portions could be attached directly to a swivel snap, such as that designated as swivel snaps 40 and 140 shown in FIGS. 1B and 3B, and the swivel snap then attached to an existing dog leash to provide the existing leash with a stretchable feature. Such shortened leash versions are illustrated as leashes 10' and 110' in FIGS. 4 and 5, respectively.

FIGS. 6A, 6B, 6C, 7, and 8 illustrate a third embodiment in which elements identical to elements of the first embodiment shown in FIGS. 1A, 1B and 2 have identical reference numbers but increased by 200. The third embodiment leash 210 includes an inelastic looped strap forming handle 212.

Handle 212 has a first section 212a attached to the middle bar of outer buckle 214. The first section 212a of handle 212 is attached to outer buckle 214 by looping its end portion around the middle bar of outer buckle 214 and bringing it back upon itself, as shown, where the overlapping portions thereof are attached by any suitable means, such as sewing with stitching 216.

Handle 212 has a second, longer section 212b that passes between the outer and middle bars of outer buckle 214, and has its inner end attached to the male or female portion 254a of releasable buckle 254 by looping and stitching 215. Second section 212b forms a locking strap for locking the leash 210 in its unstretchable mode.

Releasable buckle portion 254b, which is lockingly matable with buckle portion 254a, is attached to the outer end of a shortened inelastic strap member 256 by looping and stitching 257. The inner end of inelastic strap member 256 is attached to inner buckle 224 by looping it around the middle bar thereof and attaching the overlapping portions together, such as by stitching 257.

Elastic strap portion 220 is attached to outer buckle 214 by looping its outer end through the inner bar of buckle 214 and attaching the overlapping outer end portions together by any suitable means, such as stitching 226. Elastic strap portion 220 can be formed of any commercially available elastic strap material, such as "stretch nylon".

Elastic strap portion 220 is attached to inner buckle 224 by looping its inner end through the outer bar of buckle 224 and attaching the overlapping inner end portions together by any suitable means, such as stitching 227.

An inelastic straight strap portion 230 is attached at its outer end to the inner bar of inner buckle 224 and at its inner end to swivel snap 240. Swivel snap 240 is adapted to connect to the collar of a dog (not shown) in a manner well known in the art.

Inelastic straight strap portion 230 is attached to inner buckle 24 by looping its outer end through the inner bar of buckle 224 and attaching the overlapping outer end portions together by any suitable means, such as stitching 236.

The inner end of inelastic straight strap portion 230 is looped through the buckle or clasp 242 of swivel snap 240 and brought back upon itself, as shown, where the inner end is attached to the adjacent section of inelastic strap portion 230 by any suitable means, such as stitching 237.

Swivel snap 240 can be any commercially available snap device that can be attached at one end to inelastic strap portion 230 and at its other end to a dog collar.

Outer and inner buckles 214 and 224 are generally rectangular in shape, and have three parallel "bars" extending between the sides thereof.

Handle 212, elastic strap portion 220 and inelastic strap portion 230 all are formed of strapping have substantially the same width. Preferably, the strapping width is about one inch. The length of inelastic straight strap portion 230 is preferably greater than the length of elastic strap portion 220, and preferably about twice the length of elastic strap portion 220.

The releasable buckle 254 made up of lockingly matable portions 254a and 254b may be any commercially available releasable buckle having clasps at both ends adapted to receive straps 252 and 256 therethrough for looping and stitching. A satisfactory releasable buckle 254 is of the type made by National Molding under the trademark "MOJAVE".

In FIG. 6A the leash 210 is shown in its non-stretchable mode with second section 212b of handle 212 buckled to shortened inelastic locking strap member 256 by lockingly engaging releasable buckle portions 254a and 254b. In this mode, elastic strap portion 220 is prevented from stretching.

Upon release of the two portions 254a and 254b of the releasable buckle 254, the second section 212b of handle 212 is separated from shortened inelastic locking strap 256, and elastic strap portion 220 is then free to stretch.

To prevent the second section 212b of handle 212 from slipping through outer buckle 214, a stop member 260 can be attached thereto. Stop member 260 may be, for example, a plastic or metal button.

Figure 6B:
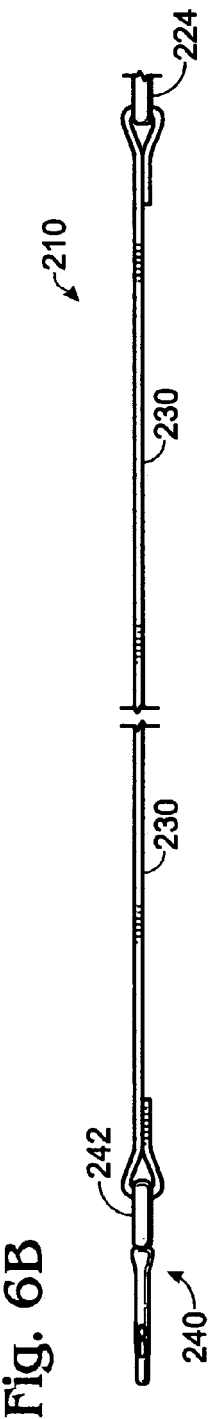
FIG. 6B is a side elevation view of the inner portion of the third embodiment of the dog leash of the present invention.
Figure 6C:
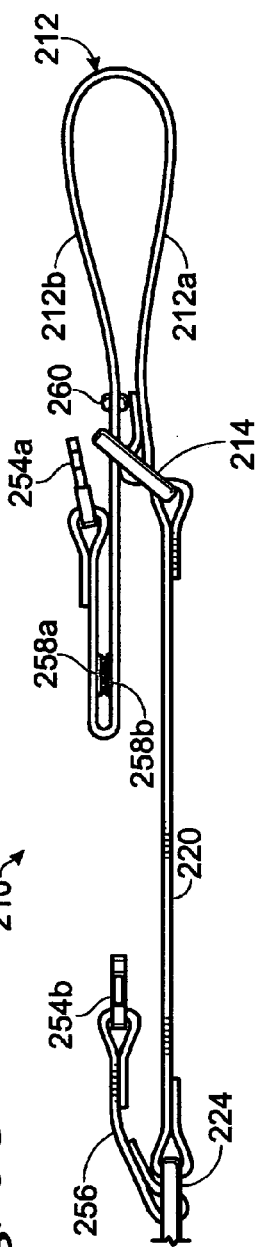
FIG. 6C is a side elevation view of the third embodiment of the dog leash of the present invention, with the locking strap portion of the looped handle shown in its unlocked mode.
Figure 7:
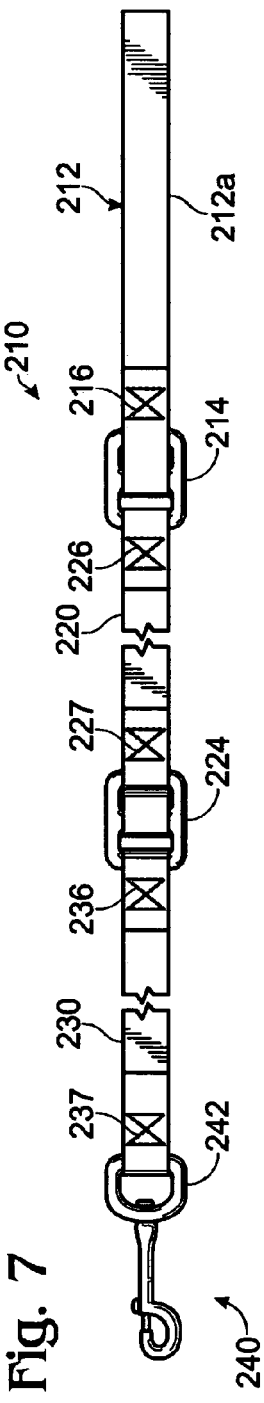
FIG. 7 is a partial bottom plan view of the third embodiment of the dog leash of the present invention.
Figure 8:
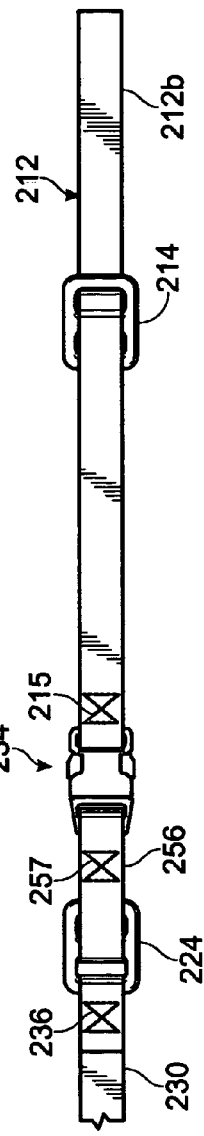
FIG. 8 is a partial top plan view of the third embodiment of the dog leash of the present invention.

To prevent the unbuckled second section 212b of handle 212 from flopping about when disengaged from shortened inelastic locking strap 256, it can be releasably attached to itself by means of mating hook and loop fastener portions 258a and 258b, as shown in FIGS. 6A and 6C. While only one mating hook and loop fastener means 258a, 258b have been shown, a plurality of such mating fastener means spaced along the second section 212b of handle 212 could be used.

Figure 9:
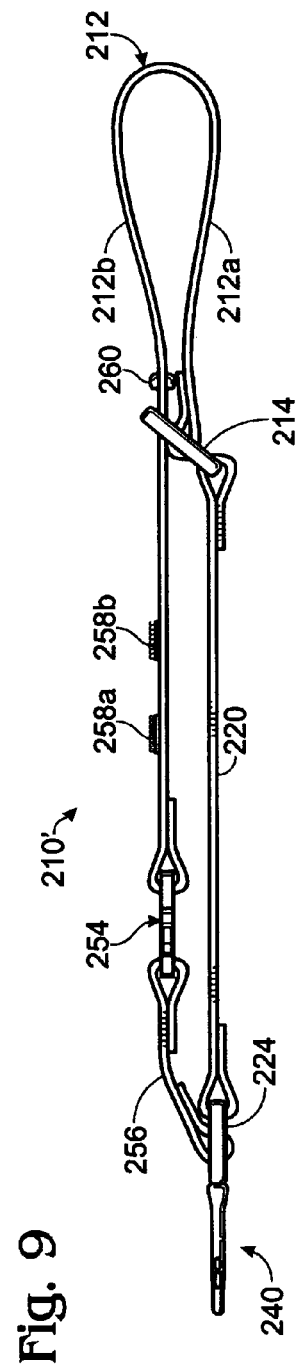
FIG. 9 is a side elevation view of a shortened version of the third embodiment of the dog leash of the present invention, with the locking strap portion of the looped handle shown in its locked mode.

While leash 210 has been shown as having a non-stretchable portion 230, the inner buckle 224 could be attached directly to a swivel snap, such as that designated as swivel snap 240 in FIG. 9, and the swivel snap 240 then attached to an existing dog leash (not shown) to provide the existing leash with a stretchable feature. Such a shortened leash version is shown as leash 210' in FIG. 9.

Figure 10A:
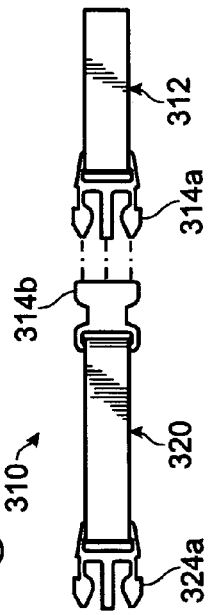
FIG. 10A is a top plan view of a fourth embodiment of the dog leash of the present invention, showing the handle and elastic portions.
Figure 10B:
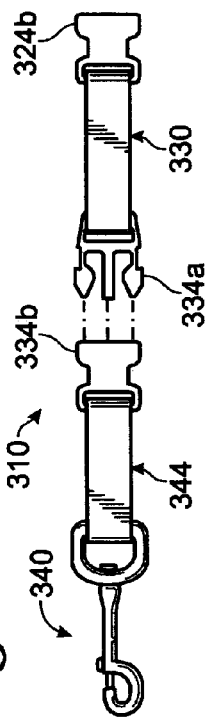
FIG. 10B is a top plan view of a fourth embodiment of the dog leash of the present invention, showing the non-elastic and swivel snap portions.

FIGS. 10A and 10B show a fourth embodiment of the dog leash of the present invention in which elements identical to elements of the first embodiment shown in FIGS. 1A, 1B and 2 have identical reference numbers but increased by 300. Thus, leash 310 includes a handle portion 312, a stretchable portion 320, a non-stretchable portion 330, and a swivel snap portion 340.

Stretchable portion 320 can have the construction of any of the stretchable portions 20, 120 or 220 of the other three embodiments 10, 110 and 210.

In the fourth embodiment shown in FIGS. 10A and 10B, the non-releasable buckles of the other embodiments have been replaced with releasable buckles. Thus, the inner end of handle 312 is attached to the male member 314a of a side release buckle and the outer end of stretchable portion 320 is attached to the female member 314b of a side release buckle, male and female members 314a and 314b being releasably attachable to each other. Similarly, the inner end of stretchable portion 320 is attached to the male member 324a of a side release buckle and the outer end of non-stretchable portion 330 is attached to the female member 324b, male and female members 324a and 324b being releasably attachable to each other. Finally, the inner end of non-stretchable portion 330 is attached to the male member 334a of a side release buckle and swivel snap portion 340 is attached via short strap portion 344 to the female member 334b of a side release buckle, male and female members 334a and 334b being releasably attachable to each other. Satisfactory releasable buckles are those manufactured by National Molding under the trademark "MOJAVE".

The segmented fourth embodiment of FIGS. 10A and 10B allows extra segments of stretchable or non-stgretchable portions to be easily added to the leash 310.

It will be obvious to those having skill in the art that many changes may be made to the details of the above-described embodiments of this invention without departing from the underlying principles thereof. The scope of the present invention should, therefore, be determined only by the following claims.

The invention claimed is:

1. A dog leash comprising:
a handle, said handle being an inelastic strap having first and second ends, said first end being attached to an outer buckle, said second end passing through said outer buckle to form a looped handle, said second end having a first releasable buckle portion attached thereto to form an outer inelastic strap portion of an inelastic locking strap member;
an elastic first strap portion having an outer and inner end, said elastic first strap portion being attached at its outer end to said outer buckle and attached at its inner end to an inner buckle;
an inelastic second strap portion having an outer and inner end, said inelastic second strap portion being attached at its outer end to said inner buckle and attached at its inner end to a dog collar attachment means; and
an inner inelastic strap member having outer and inner ends, said inner elastic strap member being attached at its inner end to said inner buckle and attached at its outer end to a second releasable buckle portion to form an inner inelastic strap portion of said inelastic locking strap member, said first and second releasable buckle portions adapted to releasably mate to form a locked configuration of said inelastic locking strap member and adapted to be disengaged to form an unlocked configuration of said inelastic locking strap member.

2. The dog leash of claim 1 including a stop member located on that portion of second end of said handle located outwardly of said outer buckle, said stop member adapted to prevent said second end of said handle from being pulled through said outer buckle once said inner and outer portions of said inelastic locking strap have been releasably mated to form a locked configuration.

3. The dog leash of claim 1 wherein said inner and outer buckles are releasable buckles.

4. A dog leash comprising:
a handle, said handle being an inelastic strap having first and second ends, said first end being attached to an outer buckle, said second end passing through said outer buckle to form a looped handle, said second end having a first releasable buckle portion attached thereto to form an outer inelastic strap portion of an inelastic locking strap member;
an elastic first strap portion having an outer and inner end, said elastic first strap portion being attached at its outer end to said outer buckle and attached at its inner end to a dog collar attachment means; and
an inner inelastic strap member having outer and inner ends, said inner elastic strap member being attached at its inner end to said inner buckle and attached at its outer end to a second releasable buckle portion to form an inner inelastic strap portion of said inelastic locking strap member, said first and second releasable buckle portions adapted to releasably mate to form a locked configuration of said inelastic locking strap member and adapted to be disengaged to form an unlocked configuration of said inelastic locking strap member.

5. The dog leash of claim 4 including a stop member located on that portion of second end of said handle located outwardly of said outer buckle, said stop member adapted to prevent said second end of said handle from being pulled through said outer buckle once said inner and outer portions of said inelastic locking strap have been releasably mated to form a locked configuration.

6. The dog leash of claim 4 wherein said inner and outer buckles are releasable buckles.

* * * * *